United States Patent

Hwang

[11] Patent Number: 5,875,819
[45] Date of Patent: Mar. 2, 1999

[54] DISCHARGE VALVE APPARATUS FOR HERMETIC COMPRESSION

[75] Inventor: Jae Moon Hwang, Kyungsangnam-Do, Rep. of Korea

[73] Assignee: LG Electronics, Inc., Rep. of Korea

[21] Appl. No.: 781,899

[22] Filed: Dec. 30, 1996

[30] Foreign Application Priority Data

Dec. 30, 1995 [KR] Rep. of Korea ................... 1995 68677

[51] Int. Cl.[6] .................................................. F16K 15/16
[52] U.S. Cl. ........................ 137/856; 137/857; 417/559; 417/571
[58] Field of Search ..................................... 417/559, 571; 137/856, 857

[56] References Cited

U.S. PATENT DOCUMENTS

3,998,243  12/1976  Osterkorn et al. ...................... 137/856
5,110,272  5/1992  Peruzzi et al. ........................... 137/587
5,209,260  5/1993  Baek ......................................... 137/857

Primary Examiner—Timothy Thorpe
Assistant Examiner—Cheryl J. Tyler
Attorney, Agent, or Firm—Ostrolenk, Faber, Gerb & Soffen, LLP

[57] ABSTRACT

An improved discharge valve apparatus for a hermetic compressor which is capable of fixing the retainer based on the elastic force of the elastic protrusions formed in the retainer itself and the shape of the head cover engaged with the retainer, for thus reducing the number of parts and the number of processes. The apparatus includes a head cover, a head engaged with the head cover and having a groove formed in an upper surface of the head, a discharge valve inserted into the groove of the head, a valve spring inserted into the groove of the head for limiting a movement of the discharge valve, and placed on an upper surface of the discharge valve, and a retainer inserted into the groove, and positioned on an upper portion of the valve spring, and having elastic protrusions formed at both sides thereof.

3 Claims, 8 Drawing Sheets

CONVENTIONAL ART

DISCHARGE VALVE APPARATUS FOR HERMETIC COMPRESSION

BACKGROUND OF THE INVENTION

1. Field of the Invention

The present invention relates to a discharge valve apparatus for a hermetic compressor, and in particular to an improved discharge valve apparatus for a hermetic compressor which is capable of elastically preventing a vibration of a discharge valve by controlling the movement of a discharge valve and a valve spring inserted in a groove formed in a head, and engaging the retainer into the groove of the head by using an elastic force of elastic protrusions formed in the retainer.

2. Description of the Convention al Art

Figure 1:
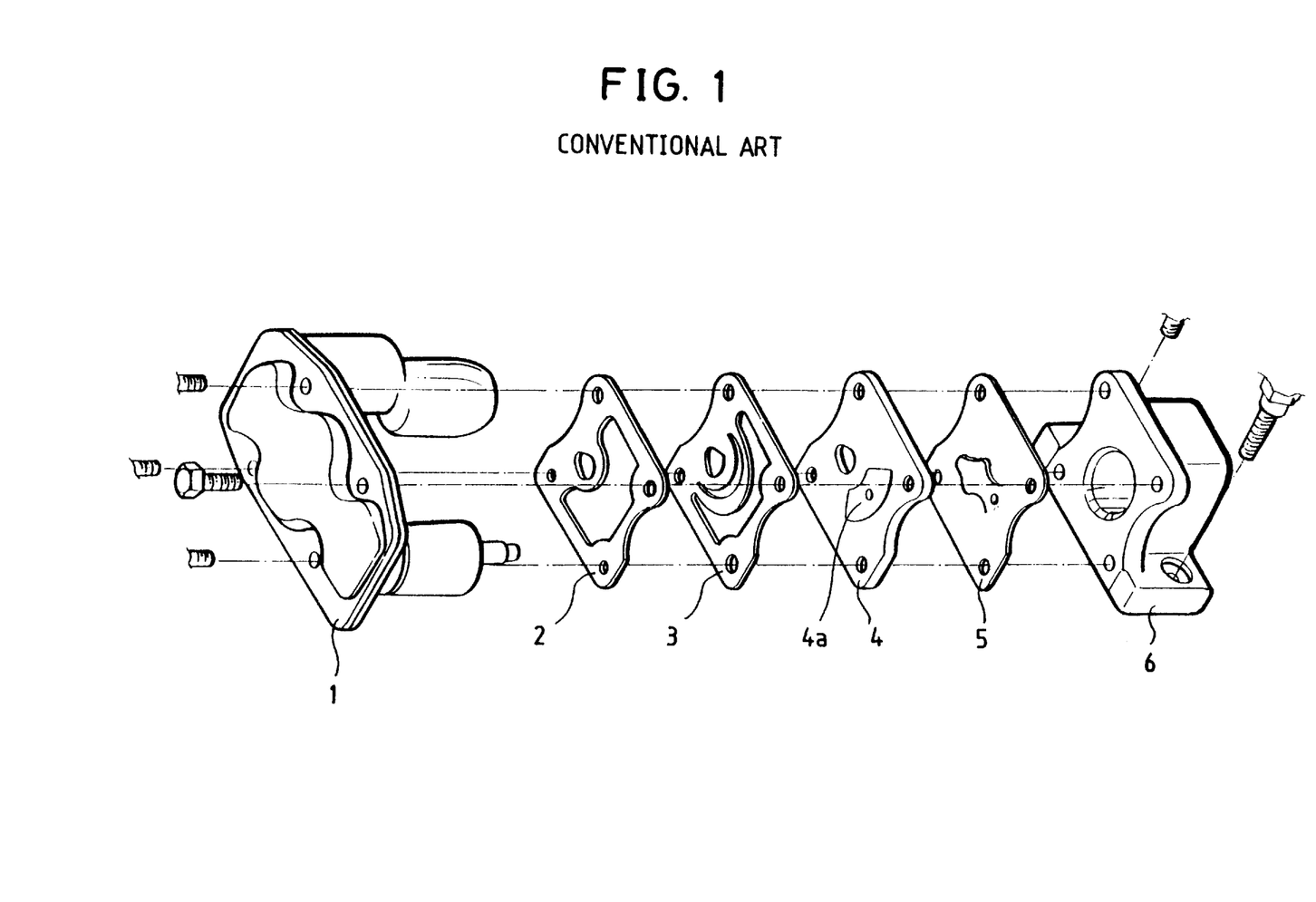
FIG. 1 is an exploded perspective view illustrating a valve apparatus for a conventional hermetic compressor.

FIG. 1 is an exploded perspective view illustrating a valve apparatus for a conventional hermetic compressor.

As shown therein, the conventional discharge valve apparatus of a hermetic compressor according to the present invention includes a head cover 1 to which a packing 2, a discharge valve 3, a head 4, a suction valve 5, and a cylinder 6 are engage d in order.

However, the conventional discharge valve apparatus of a hermetic compressor has disadvantages in that since the discharge valve 3 and the head 4 are separated from each other, the area of a discharge hole 4a of the head 4 is increased, in which area a refrigerant can be re-expanded, so that the amount of a suction refrigerant is decreased, for thus degrading the performance of the hermetic compressor.

Figure 2:
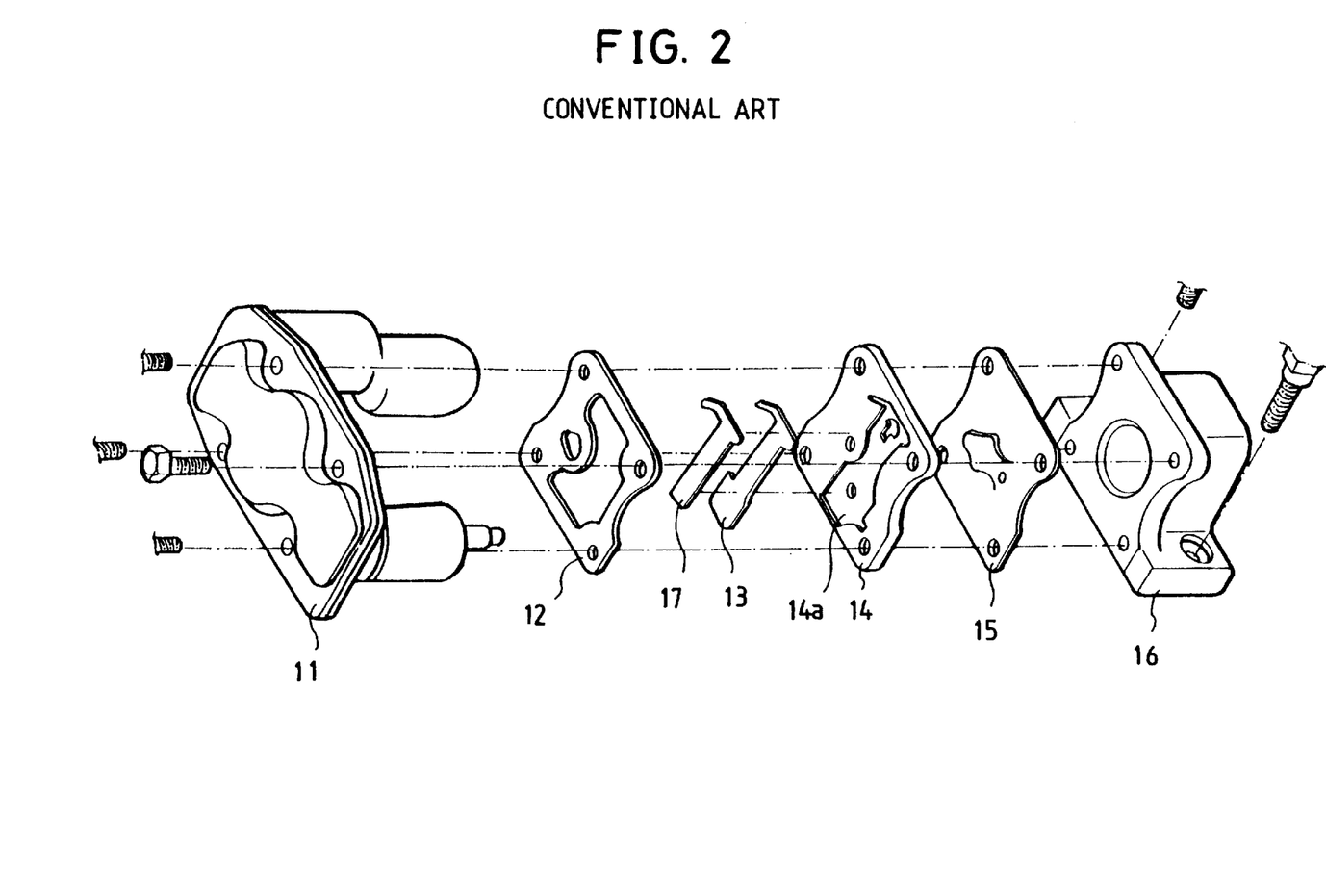
FIG. 2 is an exploded perspective view illustrating a valve apparatus for a second type of conventional hermetic compressor.

Therefore, in order to avoid the above described problems, a groove 14a, as shown in FIG. 2, is formed in an upper surface of a head 14. A discharge valve 13 and a valve spring 17 are inserted into a groove 14a in order. In addition, the head 14, to which a packing 12, the discharge valve 13, and the valve spring 17 are coupled in order, a suction valve 15, and the cylinder 16 are engaged in order so as to form the discharge valve apparatus of the hermetic compressor.

However, the discharge valve 13 is ideally opened/closed one time whenever the refrigerant is discharged. However, in the above-described discharge valve apparatus of a hermetic compressor, the discharge valve 13 are opened and closed three times whenever the refrigerant is discharged.

Figure 3:
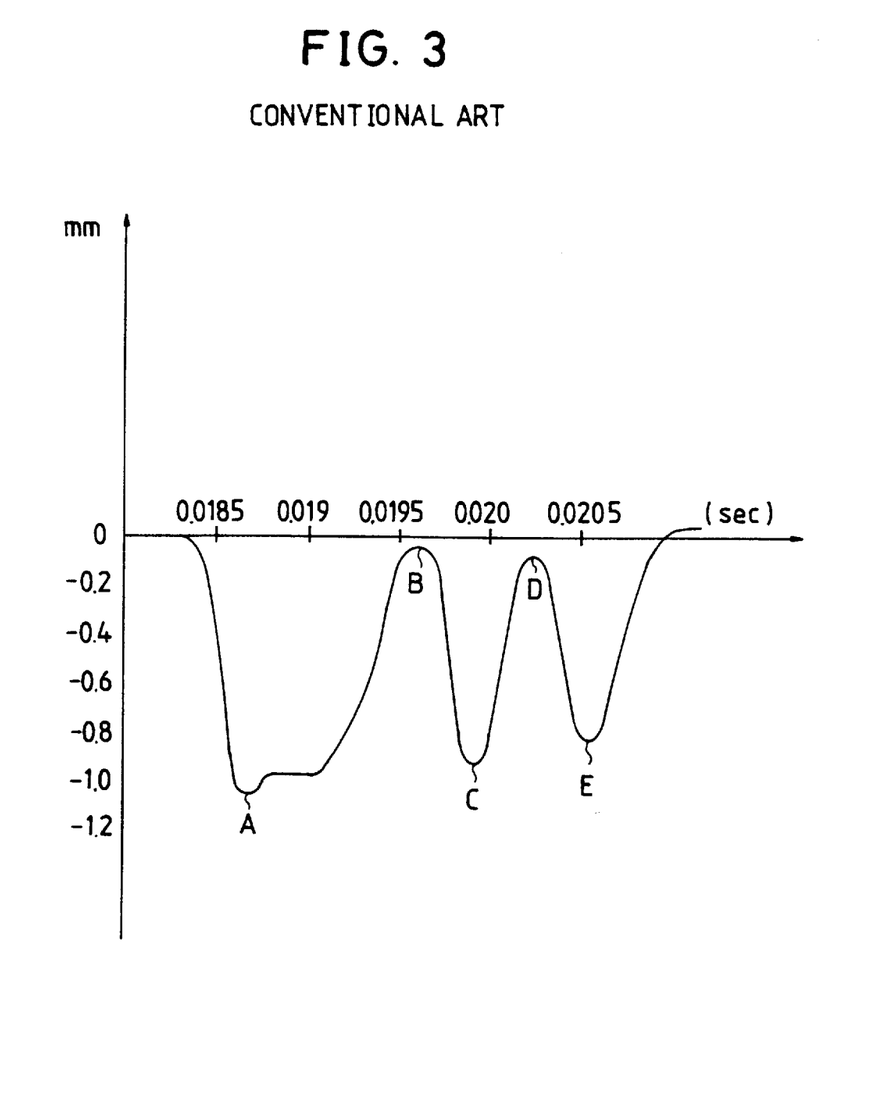
FIG. 3 is a graph illustrating a movement of a discharge valve of a valve apparatus of a conventional hermetic compressor of FIG. 2.

In more detail, as shown in FIG. 3, when the initial time is 0(zero), and the distance is 0, the discharge valve 13 is closed. After a predetermined time, the distance, within which the discharge valve 13 is opened, is changed from a point "A" through a point "E" as shown in FIG. 3.

Here, the point "A" as shown in FIG. 3 denotes that the discharge valve 13 is substantially opened, and the point "B" denotes that the discharge valve 13 is closed in cooperation with the elastic force of the discharge valve 13, and points "C, D, and E" denote that the discharge valve 13 is abnormally opened or closed.

Therefore, if the discharge valve 13 is opened and closed three times whenever the refrigerant is discharged, in particular, when the discharge valve 13 is closed, the flow of the discharged gas is blocked, for thus reducing the discharge amount of the refrigerant and degrading the performance of the hermetic compressor.

In addition, since the discharge valve 13 and the valve spring 17 inserted into the groove 14a are not supported, the discharge valve 13 is vibrated during an operation of the compressor, for thus blocking the flow of the refrigerant gas.

SUMMARY OF THE INVENTION

Accordingly, it is an object of the present invention to provide a discharge valve apparatus for a hermetic compressor which overcomes the problems encountered in the conventional art.

It is another object of the present invention to provide a discharge valve apparatus for a hermetic compressor which is capable of elastically preventing a vibration of a discharge valve by controlling the movement of a discharge valve and a valve spring inserted in a groove formed in a head, and engaging the retainer into the groove of the head by using an elastic force of elastic protrusions formed in the retainer.

It is another object of the present invention to provide a discharge valve apparatus for a hermetic compressor which is capable of fixing the retainer based on the elastic force of the elastic protrusions formed in the retainer itself and the shape of the head cover engaged with the retainer, for thus reducing the number of parts and the number of processes.

To achieve the above objects, there is provided a discharge valve apparatus for a hermetic compressor which includes a head cover, a head engaged with the head cover and having a groove formed in an upper surface of the head, a discharge valve inserted into the groove of the head, a valve spring inserted into the groove of the head for limiting a movement of the discharge valve, and placed on an upper surface of the discharge valve, and a retainer inserted into the groove, and positioned on an upper portion of the valve spring, and having elastic protrusions formed at both sides thereof.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 4:
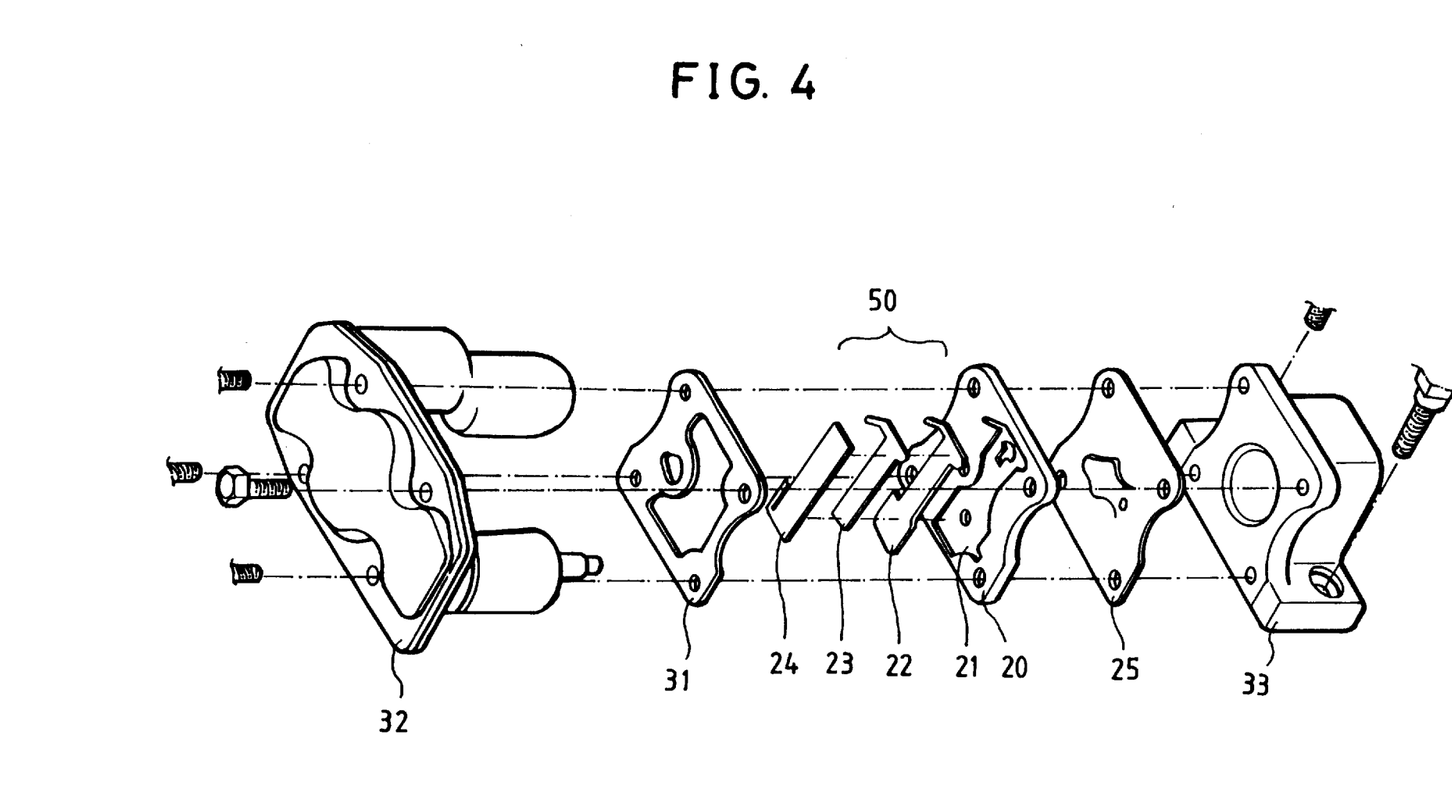
FIG. 4 is an exploded perspective view illustrating a discharge valve apparatus for a hermetic compressor according to the present invention.

FIG. 4 is an exploded perspective view illustrating a discharge valve apparatus for a hermetic compressor according to the present invention.

As shown therein, the discharge valve apparatus for a hermetic compressor according to the present invention includes a head cover to which a packing 31, a head assembly 50, a suction valve 25, and a cylinder 33 are engaged in order.

Here, the head assembly 50 includes a head 20, a discharge valve 22, a valve spring 23, and a retainer 24.

The construction of the head assembly 50 will now be explained.

Figure 6:
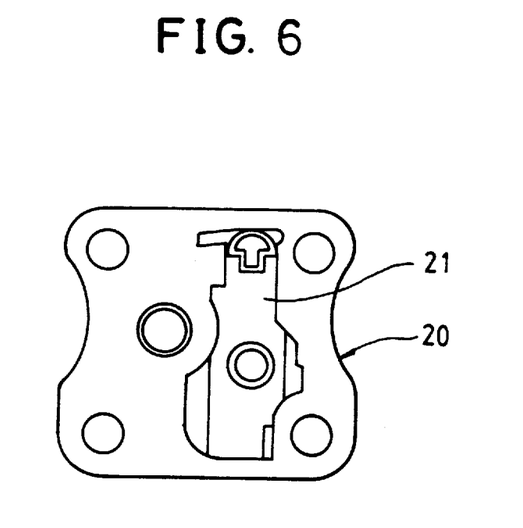
FIG. 6 is a top view illustrating a head of a discharge valve apparatus for a hermetic compressor according to the present invention.

As shown in FIG. 6, a groove 21 is formed in an upper surface of the head 20. The discharge valve 22 for opening/closing a discharge outlet for the compressed refrigerant gas is tightly inserted into the groove 21.

In addition, the valve spring 23 for limiting the movement of the discharge valve 22 and the retainer 24 are inserted into the groove 21.

Figure 7A:
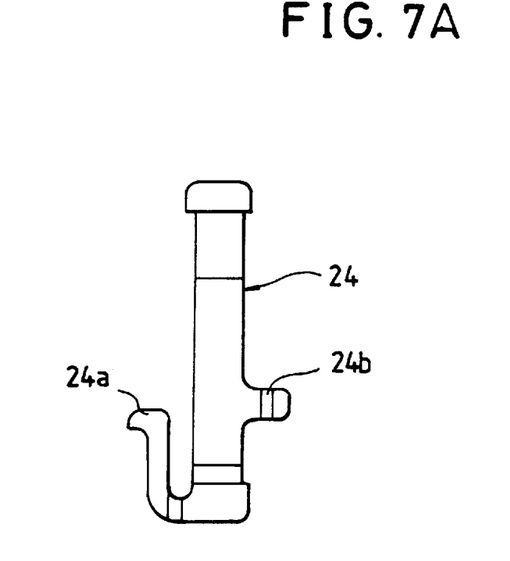
FIG. 7A is a top view illustrating a retainer of a discharge valve apparatus for a hermetic compressor according to the present invention.
Figure 7B:
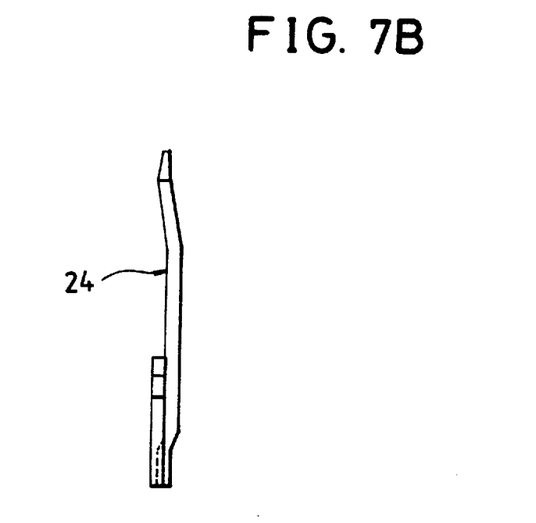
FIG. 7B is a side view illustrating a retainer of a discharge valve apparatus for a discharge valve apparatus for a hermetic compressor according to the present invention.
Figure 7C:
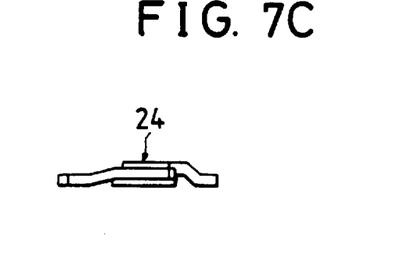
FIG. 7C is a front view illustrating a retainer of a discharge valve apparatus for a hermetic compressor according to the present invention.

Since elastic protrusions 24a and 24b, as shown in FIG. 7A through 7C, are formed at both sides of the retainer 24, the elastic protrusions 24a and 24b are elastically pushed into the groove 21 of the head into which the discharge valve 22 and the valve spring 23 are inserted, and are stably engaged thereinto, so that the discharge valve 22 and the valve spring 23 are elastically supported by the elastic protrusions 24a and 24b.

When the engaging procedure of the head assembly 50 is completed in such manner, a packing 31 and a head cover 32 are placed on the head assembly 50 in order, and are fixed to the cylinder 33 by using bolts.

In the discharge valve apparatus of a hermetic compressor according to the present invention, a predetermined distance must be formed between the retainer 24 and the valve spring 23 so that the flow of the refrigerant gas is not blocked by the discharge valve 22 in order to facilitate a smooth discharge of the refrigerant gas.

Figure 9A:
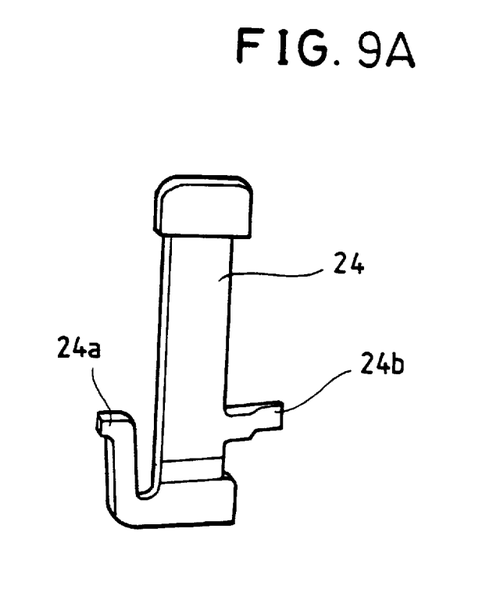
FIG. 9A is a perspective view illustrating a retainer of a discharge valve apparatus of a hermetic compressor according to the present invention.
Figure 9B:
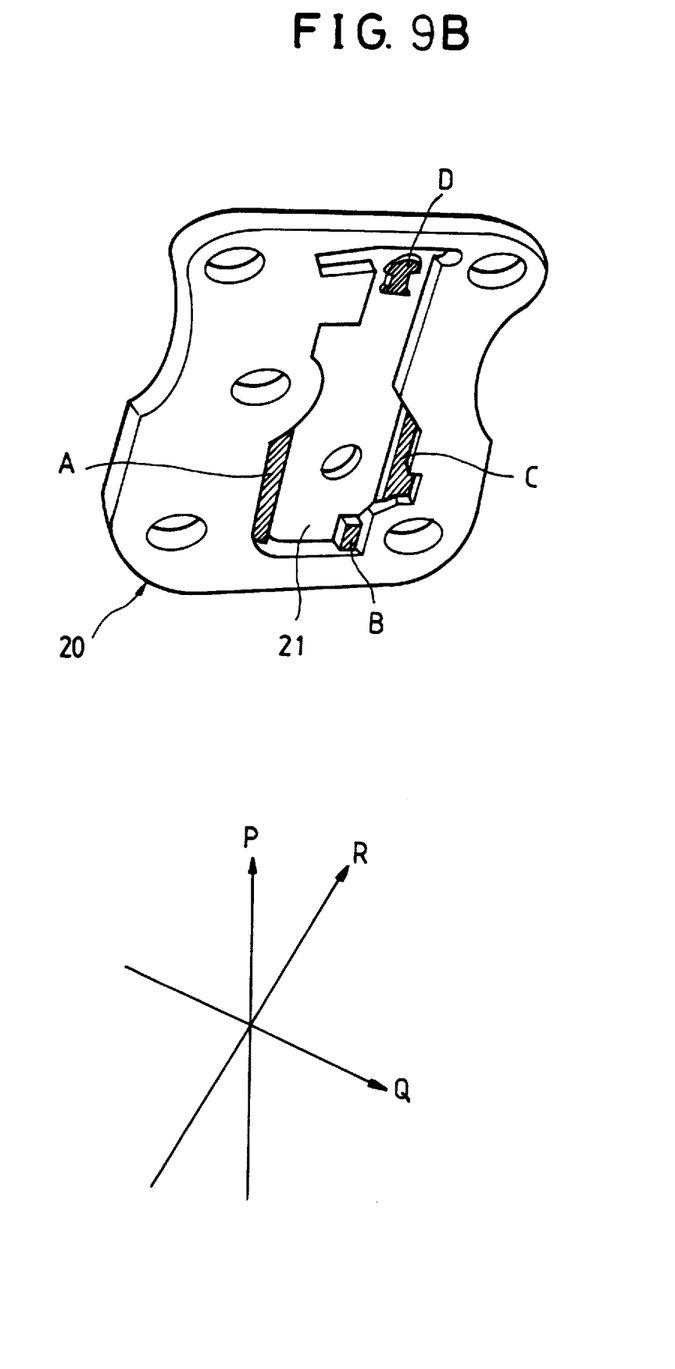
FIG. 9B is a perspective view illustrating a discharge valve apparatus of a hermetic compressor according to the present invention.

Therefore, placing surfaces A, B, C, and D having different heights are formed in the groove 21 of the head 20 as shown in FIG. 9B in order to maintain a predetermined distance therebetween and prevent the retainer 24 from being twisted.

Therefore, the retainer 24 is fixed in the direction, indicated by "Q" as shown in FIG. 9B, by the elastic protrusions 24a and 24b, but is slightly movable in the direction indicated by "P".

Figure 8:
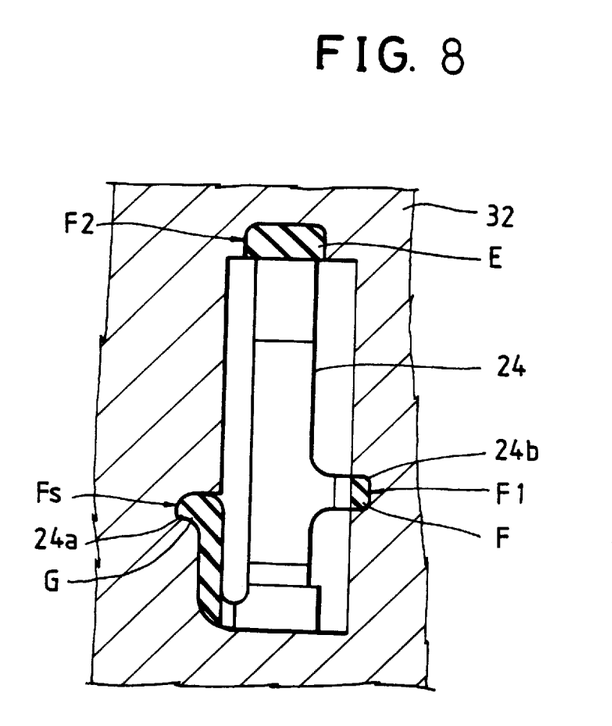
FIG. 8 is a top view illustrating a contacting portion of a retainer and a head cover of a discharge valve apparatus of a hermetic compressor according to the present invention.

In addition, since the repulsive force $F_s$, as shown in FIG. 8, generated by the elastic protrusions 24a and 24b is a divided force "$F_2$" generated by the reaction force "$F_1$" and the moment when engaging the retainer 24 to the groove 21, the engaging force of the retainer 24 is determined by the shape and position of the elastic protrusions 24a and 24b.

If the elastic protrusions 24 and 24b are not formed in the retainer 24, the retainer 24 inserted into the groove 21 can not have an elastic force in the direction "Q" as shown in FIG. 9, and it is impossible to stably engage the retainer 24 into the groove 21.

In addition, the retainer 24 and the head cover 32 overlap each other in a portion "E, F, and G" (as in double lines hatched) as shown in FIG. 8 in order to present the retainer 24 from escaping the head 20 in the direction "P" as shown in FIG. 9.

In addition, even when the head cover 32 is engaged to the head assembly 50, a pressure is not applied to the head cover 32 in cooperation with the stacked portion.

In other words, in the discharge valve apparatus for a hermetic compressor according to the present invention, the retainer 24 is placed on four portions A, B, C, and D, as shown in FIG. 9, of the groove 21 of the head 20, and three portions E, F, and G, as shown in FIG. 8, formed on the upper surface of the retainer 24 opposing to the head cover 32 are fixed by the head cover 32, for thus preventing the retainer 24 from being escaped in the direction "P" as shown in FIG. 9. In addition, the reaction force is generated in the direction "Q" as shown in FIG. 9 by the elastic protrusions 24a and 24b of the retainer 24, for thus preventing the retainer 24 from being escaped.

Figure 5:
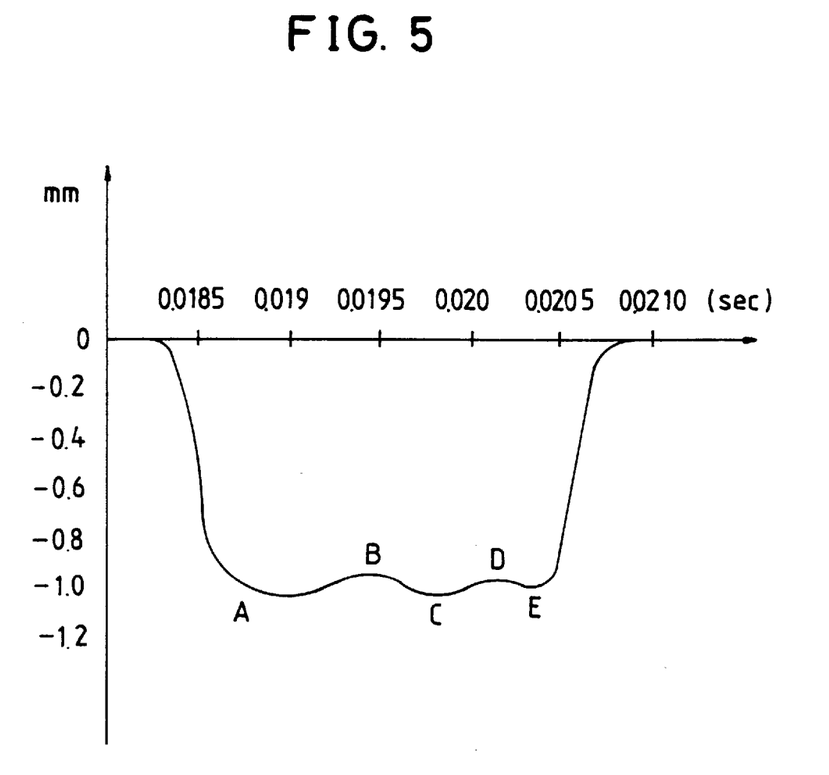
FIG. 5 is a graph illustrating a movement of a discharge valve of a discharge valve apparatus for a hermetic compressor according to the present invention.

FIG. 5 is a graph illustrating a movement of a discharge valve of a discharge valve apparatus for a hermetic compressor according to the present invention.

As shown therein, when the initial time is 0, the discharge valve 22 is closed, and points B, C, D, and E denote the interval until the discharge valve is opened.

In addition, preferably one of the elastic protrusions 24a and 24b as shown in FIG. 8 may be removed. The same effects can be obtained by changing the insertion state of the retainer 24 and the reaction force.

As described above, the discharge valve apparatus for a hermetic compressor according to the present invention is basically directed to preventing the vibration of the discharge valve during an operation of the compressor by fixing the discharge valve and the valve spring by using the retainer, for thus facilitating a smooth flow of the refrigerant gas.

In addition, the discharge valve apparatus for a hermetic compressor according to the present invention is directed to fixing the retainer based on the elastic force of the elastic protrusions formed in the retainer itself and the shape of the head cover engaged with the retainer, for thus reducing the number of parts and the number of processes.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A discharge valve apparatus for a hermetic compressor, comprising:
   a head cover;
   a head engaged with the head cover and having a groove including a plurality of placing surfaces each having different heights formed in an upper surface of the head;
   a discharge valve inserted into the groove of the head;
   a valve spring inserted into the groove of the head for limiting a movement of the discharge valve, and placed on an upper surface of the discharge valve; and
   a retainer inserted into the groove, and positioned on an upper portion of the valve spring, and having a plurality of elastic protrusions formed at different sides thereof, each of said plurality of protrusions engaging a respective one of the placing surfaces of the head.

2. The apparatus of claim 1, wherein said elastic protrusions formed in the retainer are elastically supported by the groove formed in the head and elastically supporting the discharge valve and the valve spring.

3. The apparatus of claim 1, wherein the number of said placing surfaces are four.

* * * * *

UNITED STATES PATENT AND TRADEMARK OFFICE
CERTIFICATE OF CORRECTION

PATENT NO. : 5,875,819
DATED : March 2, 1999
INVENTOR(S) : Hwang

It is certified that error appears in the above-identified patent and that said Letters Patent is hereby corrected as shown below:

On the title page, item [54] and Col.1, line 1-2,
Please correct the title as follows:

--DISCHARGE VALVE APPARATUS FOR HERMETIC COMPRESSOR--.

Signed and Sealed this

Thirteenth Day of July, 1999

Attest:

Attesting Officer

Q. TODD DICKINSON

Acting Commissioner of Patents and Trademarks